(12) United States Patent
Elfstroem et al.

(10) Patent No.: US 11,014,161 B2
(45) Date of Patent: May 25, 2021

(54) METHOD FOR ADDITIVE MANUFACTURING

(71) Applicant: Arcam AB, Moelndal (SE)

(72) Inventors: Isak Elfstroem, Kungsbacka (SE); Mattias Fager, Goeteborg (SE)

(73) Assignee: Arcam AB, Moelndal (SE)

( * ) Notice: Subject to any disclaimer, the term of this patent is extended or adjusted under 35 U.S.C. 154(b) by 779 days.

(21) Appl. No.: 15/048,450

(22) Filed: Feb. 19, 2016

(65) Prior Publication Data
US 2016/0311021 A1 Oct. 27, 2016

Related U.S. Application Data

(60) Provisional application No. 62/150,673, filed on Apr. 21, 2015.

(51) Int. Cl.
| | |
|---|---|
| *B22F 3/105* | (2006.01) |
| *B22F 10/00* | (2021.01) |
| *G05B 15/02* | (2006.01) |
| *B33Y 10/00* | (2015.01) |
| *B33Y 50/02* | (2015.01) |

(Continued)

(52) U.S. Cl.
CPC ............ *B22F 10/00* (2021.01); *B29C 64/153* (2017.08); *B33Y 10/00* (2014.12); *B33Y 30/00* (2014.12); *B33Y 50/02* (2014.12); *G05B 15/02* (2013.01); *B22F 10/10* (2021.01); *B29K 2995/0005* (2013.01); *Y02P 10/25* (2015.11)

(58) Field of Classification Search
CPC ............................... B22F 3/1055; B22F 10/00
See application file for complete search history.

(56) References Cited

U.S. PATENT DOCUMENTS

| | | | |
|---|---|---|---|
| 2,264,968 A | 12/1941 | De Forest | |
| 2,323,715 A | 7/1943 | Kuehni | |

(Continued)

FOREIGN PATENT DOCUMENTS

| | | |
|---|---|---|
| CA | 2860188 A1 | 6/2006 |
| CN | 101607311 A | 12/2009 |

(Continued)

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

(Continued)

*Primary Examiner* — Christopher S Kessler
(74) *Attorney, Agent, or Firm* — Dinsmore & Shohl LLP

(57) ABSTRACT

Various embodiments of the present invention relate to a method of using of a focus lens in additive manufacturing for forming a three-dimensional article through successive fusion, with a high energy beam, of parts of at least one layer of a powder bed provided on a work table, which parts correspond to successive cross sections of the three dimensional article, said method comprising the step of: using said focus lens for varying a spot size of said high energy beam on said powder bed as a function of an already fused thickness of said three-dimensional article below said powder which is to be fused. The invention is also related to a method for forming a three dimensional article.

19 Claims, 12 Drawing Sheets

(51) Int. Cl.
  *B29C 64/153* (2017.01)
  *B33Y 30/00* (2015.01)
  *B22F 10/10* (2021.01)

(56) References Cited

U.S. PATENT DOCUMENTS

| | | | |
|---|---|---|---|
| 3,634,644 A | 1/1972 | Ogden et al. | |
| 3,838,496 A | 10/1974 | Kelly | |
| 3,882,477 A | 5/1975 | Mueller | |
| 3,906,229 A | 9/1975 | Demeester et al. | |
| 3,908,124 A | 9/1975 | Rose | |
| 4,314,134 A | 2/1982 | Schumacher et al. | |
| 4,348,576 A | 9/1982 | Anderl et al. | |
| 4,352,565 A | 10/1982 | Rowe et al. | |
| 4,401,719 A | 8/1983 | Kobayashi et al. | |
| 4,541,055 A | 9/1985 | Wolfe et al. | |
| 4,651,002 A | 3/1987 | Anno | |
| 4,818,562 A | 4/1989 | Arcella et al. | |
| 4,863,538 A | 9/1989 | Deckard | |
| 4,888,490 A | 12/1989 | Bass et al. | |
| 4,927,992 A | 5/1990 | Whitlow et al. | |
| 4,958,431 A | 9/1990 | Clark et al. | |
| 4,988,844 A | 1/1991 | Dietrich et al. | |
| 5,118,192 A | 6/1992 | Chen et al. | |
| 5,135,695 A | 8/1992 | Marcus | |
| 5,167,989 A | 12/1992 | Dudek et al. | |
| 5,182,170 A | 1/1993 | Marcus et al. | |
| 5,204,055 A | 4/1993 | Sachs et al. | |
| 5,247,560 A | 9/1993 | Hosokawa et al. | |
| 5,393,482 A | 2/1995 | Benda et al. | |
| 5,483,036 A | 1/1996 | Giedt et al. | |
| 5,508,489 A * | 4/1996 | Benda | B22F 3/1055 219/121.76 |
| 5,511,103 A | 4/1996 | Hasegawa | |
| 5,595,670 A | 1/1997 | Mombo Caristan | |
| 5,647,931 A | 7/1997 | Retallick et al. | |
| 5,753,274 A | 5/1998 | Wilkening et al. | |
| 5,837,960 A | 11/1998 | Lewis et al. | |
| 5,876,550 A | 3/1999 | Feygin et al. | |
| 5,904,890 A | 5/1999 | Lohner et al. | |
| 5,932,290 A | 8/1999 | Lombardi et al. | |
| 6,046,426 A | 4/2000 | Jeantette et al. | |
| 6,162,378 A | 12/2000 | Bedal et al. | |
| 6,204,469 B1 | 3/2001 | Fields et al. | |
| 6,419,203 B1 | 7/2002 | Dang | |
| 6,537,052 B1 | 3/2003 | Adler | |
| 6,554,600 B1 | 4/2003 | Hofmann et al. | |
| 6,583,379 B1 | 6/2003 | Meiners et al. | |
| 6,676,892 B2 | 1/2004 | Das et al. | |
| 6,724,001 B1 | 4/2004 | Pinckney et al. | |
| 6,746,506 B2 | 6/2004 | Liu et al. | |
| 6,751,516 B1 | 6/2004 | Richardson | |
| 6,764,636 B1 | 7/2004 | Allanic et al. | |
| 6,811,744 B2 | 11/2004 | Keicher et al. | |
| 6,815,636 B2 | 11/2004 | Chung et al. | |
| 6,824,714 B1 | 11/2004 | Türck et al. | |
| 7,003,864 B2 | 2/2006 | Dirscherl | |
| 7,020,539 B1 | 3/2006 | Kovacevic et al. | |
| 7,165,498 B2 | 1/2007 | Mackrill et al. | |
| 7,204,684 B2 | 4/2007 | Ederer et al. | |
| 7,291,002 B2 | 11/2007 | Russell et al. | |
| 7,452,500 B2 | 11/2008 | Uckelmann | |
| 7,454,262 B2 | 11/2008 | Larsson et al. | |
| 7,537,722 B2 | 5/2009 | Andersson et al. | |
| 7,540,738 B2 | 6/2009 | Larsson et al. | |
| 7,569,174 B2 | 8/2009 | Ruatta et al. | |
| 7,635,825 B2 | 12/2009 | Larsson | |
| 7,686,605 B2 | 3/2010 | Perret et al. | |
| 7,696,501 B2 | 4/2010 | Jones | |
| 7,713,454 B2 | 5/2010 | Larsson | |
| 7,754,135 B2 | 7/2010 | Abe et al. | |
| 7,799,253 B2 | 9/2010 | Höchsmann et al. | |
| 7,871,551 B2 | 1/2011 | Wallgren et al. | |
| 8,021,138 B2 | 9/2011 | Green | |
| 8,083,513 B2 | 12/2011 | Montero-Escuder et al. | |
| 8,137,739 B2 | 3/2012 | Philippi et al. | |
| 8,187,521 B2 | 5/2012 | Larsson et al. | |
| 8,308,466 B2 | 11/2012 | Ackelid et al. | |
| 8,992,816 B2 | 3/2015 | Jonasson et al. | |
| 9,073,265 B2 | 7/2015 | Snis | |
| 9,079,248 B2 | 7/2015 | Ackelid | |
| 9,126,167 B2 | 9/2015 | Ljungblad | |
| 9,254,535 B2 | 2/2016 | Buller et al. | |
| 9,310,188 B2 | 4/2016 | Snis | |
| 9,505,172 B2 | 11/2016 | Ljungblad | |
| 9,550,207 B2 | 1/2017 | Ackelid | |
| 9,802,253 B2 | 10/2017 | Jonasson | |
| 9,950,367 B2 | 4/2018 | Backlund et al. | |
| 10,071,422 B2 | 9/2018 | Buller et al. | |
| 2002/0104973 A1 | 8/2002 | Kerekes | |
| 2002/0152002 A1 | 10/2002 | Lindemann et al. | |
| 2002/0195747 A1 | 12/2002 | Hull et al. | |
| 2003/0043360 A1 | 3/2003 | Farnworth | |
| 2003/0133822 A1 | 7/2003 | Harryson | |
| 2003/0205851 A1 | 11/2003 | Laschutza et al. | |
| 2004/0012124 A1 | 1/2004 | Li et al. | |
| 2004/0026807 A1 | 2/2004 | Andersson et al. | |
| 2004/0084814 A1 | 5/2004 | Boyd et al. | |
| 2004/0104499 A1 | 6/2004 | Keller | |
| 2004/0148048 A1 | 7/2004 | Farnworth | |
| 2004/0173496 A1 | 9/2004 | Srinivasan | |
| 2004/0173946 A1 | 9/2004 | Pfeifer et al. | |
| 2004/0204765 A1 | 10/2004 | Fenning et al. | |
| 2004/0217095 A1 | 11/2004 | Herzog | |
| 2005/0173380 A1 | 8/2005 | Carbone | |
| 2005/0186538 A1 | 8/2005 | Uckelmann | |
| 2005/0282300 A1 | 12/2005 | Yun et al. | |
| 2006/0108712 A1 | 5/2006 | Mattes | |
| 2006/0138325 A1 | 6/2006 | Choi | |
| 2006/0145381 A1 | 7/2006 | Larsson | |
| 2006/0147332 A1 | 7/2006 | Jones et al. | |
| 2006/0157892 A1 | 7/2006 | Larsson | |
| 2006/0180957 A1 | 8/2006 | Hopkinson et al. | |
| 2006/0284088 A1 | 12/2006 | Fukunaga et al. | |
| 2007/0074659 A1 | 4/2007 | Wahlstrom | |
| 2007/0175875 A1 | 8/2007 | Uckelmann et al. | |
| 2007/0179655 A1 | 8/2007 | Farnworth | |
| 2007/0182289 A1 | 8/2007 | Kigawa et al. | |
| 2007/0298182 A1 | 12/2007 | Perret et al. | |
| 2008/0236738 A1 | 10/2008 | Lo et al. | |
| 2009/0017219 A1 | 1/2009 | Paasche et al. | |
| 2009/0152771 A1 | 6/2009 | Philippi et al. | |
| 2009/0176007 A1 | 7/2009 | Uckelmann | |
| 2009/0206056 A1 | 8/2009 | Xu et al. | |
| 2010/0007062 A1 | 1/2010 | Larsson et al. | |
| 2010/0260410 A1 | 10/2010 | Taminger et al. | |
| 2010/0305743 A1 | 12/2010 | Larsson | |
| 2010/0310404 A1 | 12/2010 | Ackelid | |
| 2010/0316856 A1 | 12/2010 | Currie et al. | |
| 2011/0061591 A1 | 3/2011 | Stecker | |
| 2011/0114839 A1 | 5/2011 | Stecker et al. | |
| 2011/0133367 A1 | 6/2011 | Weidinger et al. | |
| 2011/0240607 A1 | 10/2011 | Stecker et al. | |
| 2011/0241575 A1 | 10/2011 | Caiafa et al. | |
| 2011/0293770 A1 | 12/2011 | Ackelid et al. | |
| 2011/0293771 A1 | 12/2011 | Oberhofer et al. | |
| 2011/0309554 A1 | 12/2011 | Liska et al. | |
| 2011/0316178 A1 | 12/2011 | Uckelmann | |
| 2012/0100031 A1 | 4/2012 | Ljungblad | |
| 2012/0164322 A1 | 6/2012 | Teulet et al. | |
| 2012/0183701 A1 | 7/2012 | Pilz et al. | |
| 2012/0193530 A1 | 8/2012 | Parker et al. | |
| 2012/0211155 A1 | 8/2012 | Wehning et al. | |
| 2012/0223059 A1 | 9/2012 | Ljungblad et al. | |
| 2012/0225210 A1 | 9/2012 | Fruth | |
| 2012/0237745 A1 | 9/2012 | Dierkes et al. | |
| 2012/0266815 A1 | 10/2012 | Brunermer | |
| 2013/0055568 A1 | 3/2013 | Dusel et al. | |
| 2013/0162134 A1 | 6/2013 | Mattausch et al. | |
| 2013/0186514 A1 | 7/2013 | Zhuang et al. | |
| 2013/0216959 A1 | 8/2013 | Tanaka et al. | |
| 2013/0228302 A1 | 9/2013 | Rickenbacher et al. | |
| 2013/0233846 A1 | 9/2013 | Jakimov et al. | |
| 2013/0264750 A1 | 10/2013 | Hofacker et al. | |

(56) References Cited

U.S. PATENT DOCUMENTS

| | | |
|---|---|---|
| 2013/0270750 A1 | 10/2013 | Green |
| 2013/0278920 A1 | 10/2013 | Loewgren |
| 2013/0300286 A1 | 11/2013 | Ljungblad et al. |
| 2014/0175708 A1 | 6/2014 | Echigo et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1* | 8/2016 | Ashton ................ B22F 3/1055 |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0154444 A1 | 6/2018 | Jonasson |

FOREIGN PATENT DOCUMENTS

| | | | |
|---|---|---|---|
| CN | 101635210 A | | 1/2010 |
| CN | 201693176 U | | 1/2011 |
| CN | 101607311 B | | 9/2011 |
| CN | 102470439 A | | 5/2012 |
| CN | 203509463 U | | 4/2014 |
| DE | 19952998 A1 | | 5/2001 |
| DE | 20305843 U1 | | 7/2003 |
| DE | 10235434 A1 | | 2/2004 |
| DE | 102005014483 A1 | | 10/2006 |
| DE | 202008005417 U1 | | 8/2008 |
| DE | 102007018601 A1 | | 10/2008 |
| DE | 102007029052 A1 | | 1/2009 |
| DE | 102008012064 A1 | | 9/2009 |
| DE | 102010041284 A1 | | 3/2012 |
| DE | 102011105045 B3 | | 6/2012 |
| DE | 102013210242 A1 | | 12/2014 |
| EP | 0289116 A1 | | 11/1988 |
| EP | 0322257 A2 | | 6/1989 |
| EP | 0688262 A1 | | 12/1995 |
| EP | 1358994 A1 | | 11/2003 |
| EP | 1418013 A1 | | 5/2004 |
| EP | 1466718 A2 | | 10/2004 |
| EP | 1486318 A2 | | 12/2004 |
| EP | 1669143 A1 | | 6/2006 |
| EP | 1683593 A2 | | 7/2006 |
| EP | 1721725 A1 | | 11/2006 |
| EP | 1752240 A1 | | 2/2007 |
| EP | 1952932 A2 | | 8/2008 |
| EP | 2011631 A1 | | 1/2009 |
| EP | 2119530 A1 | | 11/2009 |
| EP | 2281677 A1 | | 2/2011 |
| EP | 2289652 A1 | | 3/2011 |
| EP | 2292357 A1 | | 3/2011 |
| EP | 2832474 A1 | | 2/2015 |
| FR | 2980380 A1 | | 3/2013 |
| JP | H05-171423 A | | 7/1993 |
| JP | 2003241394 A | | 8/2003 |
| JP | 2003245981 | | 9/2003 |
| JP | 2009006509 A | | 1/2009 |
| SE | 524467 C2 | | 8/2004 |
| WO | WO 1993/008928 | | 5/1993 |
| WO | WO 1996/012607 A1 | | 5/1996 |
| WO | WO 1997/037523 A2 | | 10/1997 |
| WO | WO 2001/081031 A1 | | 11/2001 |
| WO | WO 2001/085386 A2 | | 11/2001 |
| WO | WO 2002/008653 A1 | | 1/2002 |
| WO | WO 2004/007124 A1 | | 1/2004 |
| WO | WO 2004/043680 A2 | | 5/2004 |
| WO | WO 2004/054743 A1 | | 7/2004 |
| WO | WO 2004/056511 A1 | | 7/2004 |
| WO | WO 2004/106041 A2 | | 12/2004 |
| WO | WO 2004/108398 A1 | | 12/2004 |
| WO | WO 2006/091097 A2 | | 8/2006 |
| WO | WO 2006/121374 A1 | | 11/2006 |
| WO | 2006133034 A1 | | 12/2006 |
| WO | WO 2007/112808 A1 | | 10/2007 |
| WO | WO 2007/147221 A1 | | 12/2007 |
| WO | WO 2008/013483 A1 | | 1/2008 |
| WO | WO 2008/057844 A1 | | 5/2008 |
| WO | WO 2008/074287 A1 | | 6/2008 |
| WO | WO 2008/125497 A1 | | 10/2008 |
| WO | WO 2008/147306 A1 | | 12/2008 |
| WO | WO 2009/000360 A1 | | 12/2008 |
| WO | WO 2009/072935 A1 | | 6/2009 |
| WO | WO 2009/084991 A1 | | 7/2009 |
| WO | WO 2010/095987 A1 | | 8/2010 |
| WO | WO 2010/125371 A1 | | 11/2010 |
| WO | WO 2011/008143 A1 | | 1/2011 |
| WO | WO 2011/011818 A1 | | 2/2011 |
| WO | WO 2011/030017 A1 | | 3/2011 |
| WO | WO 2011/060312 A2 | | 5/2011 |
| WO | WO 2012/102655 A1 | | 8/2012 |
| WO | WO 2013/092997 A1 | | 6/2013 |
| WO | WO 2013/098050 A1 | | 7/2013 |
| WO | WO 2013/098135 A1 | | 7/2013 |
| WO | WO 2013/159811 A1 | | 10/2013 |
| WO | WO 2013/167194 A1 | | 11/2013 |
| WO | WO 2013/178825 A2 | | 12/2013 |
| WO | WO 2014/071968 A1 | | 5/2014 |
| WO | WO 2014/092651 A1 | | 6/2014 |
| WO | WO 2014/095200 A1 | | 6/2014 |
| WO | WO 2014/095208 A1 | | 6/2014 |
| WO | WO 2014/195068 A1 | | 12/2014 |

(56) References Cited

FOREIGN PATENT DOCUMENTS

| WO | 2015040433 A2 | 3/2015 |
|---|---|---|
| WO | WO 2015/032590 A2 | 3/2015 |
| WO | WO 2015/091813 A1 | 6/2015 |
| WO | WO 2015/120168 A1 | 8/2015 |
| WO | WO 2015/142492 A1 | 9/2015 |

OTHER PUBLICATIONS

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

Weigel, T., et al., "Design and Preparation of Polymeric Scaffolds for Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

Klassen, Alexander, et al., "Modelling of Electron Beam Absorption in Complex Geometries", *Journal of Physics D: Applied Physics*, Jan 15, 2014, 12 pages, vol. 47, No. 6, Institute of Physics Publishing Ltd., Great Britain.

Gibson, D.W., et al., "Additive Manufacturing Technologies: Rapid Prototyping to Direct Digital Manufacturing", 2010, pp. 126-129, Springer, New York.

Motojima, Seiji, et al., "Chemical Vapor Growth of LaB6 Whiskers and Crystals Having a Sharp Tip", Journal of Crystal Growth, vol. 44, No. 1, Aug. 1, 1978 (Aug. 1, 1978), pp. 106-109.

European Extended Search Report for EP Application No. 20151783.6 dated Jun. 18, 2020 (8 pages).

International Search Report and Written Opinion dated Jul. 18, 2016 for PCT/EP2016/057696 (13 pages).

\* cited by examiner

METHOD FOR ADDITIVE MANUFACTURING

CROSS-REFERENCE TO RELATED APPLICATIONS

This application claims priority to and the benefit of U.S. Provisional Patent Application Ser. No. 62/150,673, filed Apr. 21, 2015, the contents of which as are hereby incorporated by reference in their entirety.

BACKGROUND

Related Field

Various embodiments of the present invention relates to a method for forming a three-dimensional article.

Description of Related Art

Freeform fabrication or additive manufacturing is a method for forming three-dimensional articles through successive fusion of chosen parts of powder layers applied to a worktable. A method and apparatus according to this technique is disclosed in WO2012/102655.

Such an apparatus may comprise a work table on which the three-dimensional article is to be formed, a powder dispenser, arranged to lay down a thin layer of powder on the work table for the formation of a powder bed, a high energy beam source for delivering an energy to the powder whereby fusion of the powder takes place, elements for control of the energy beam given off by the energy beam source over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

It has been shown that different shapes of the three-dimensional article which is to be built may result in different material properties of the final product if using the same settings in the additive manufacturing apparatus. For this reason there is a need in the art to identify at least one design parameter in the three-dimensional article to be built which can be used for manipulating a process theme for improving the material characteristics.

BRIEF SUMMARY

Having this background, an object of the invention is to provide a method for additive manufacturing with improved material characteristics. The above-mentioned object is achieved by the features according to the claims contained herein.

According to various embodiments, it is provided a method of using at least one means of altering a spot size of a high energy beam in an additive manufacturing apparatus for forming a three-dimensional article through successive fusion of parts of at least one layer of powder provided on a work table, which parts correspond to successive cross sections of the three dimensional article, the method comprising the step of using the means for varying a FWHM (Full Width Half Maximum) of the high energy beam as a function of an already fused thickness of the three-dimensional article below the layer of powder which is to be fused, wherein the FWHM of the high energy beam is decreased for a decreased already fused thickness of the three dimensional article for counteracting an undesired widening of a melt pool when fusing the powder.

An exemplary and non-limiting advantage of the present invention is that porosities for negative surfaces of built three-dimensional articles may be reduced or eliminated. Another advantage is that thinner overhangs may be built with the inventive focus spot variation as a function of the already fused thickness of the three-dimensional article below the layer of powder which is to be fused without any inclusions or porosity in the final product.

In an example embodiment of the present invention the energy beam is a laser beam or an electron beam. A non-limiting advantage of at least this embodiment is that the invention is independent of the energy beam source used.

In still another example embodiment of the present invention the thickness of the three-dimensional article is the thickness directly below a spot of the high energy beam on the layer of powder. A non-limiting advantage of at least this embodiment is that the shape of the energy beam may be customized depending on the actual already fused thickness directly below the energy beam in the powder layer. This may be particularly advantageous in cases where a three-dimensional article have numerous thickness variations within a relatively short range.

In still another example embodiment of the present invention the thickness is a total number of powder layers which have been fused. A non-limiting advantage of at least this embodiment is that one only has to count the total number of powder layers which has been fused from the starting of forming the three-dimensional article. Another non-limiting advantage of at least this embodiment is that it may ignore a few unfused layers embedded in fused layers, for instance narrow cooling channels.

In still another example embodiment of the present invention the thickness is the uninterrupted total number of powder layers which have been homogenously fused together. A non-limiting advantage of at least this embodiment is that the thickness starts from a top surface of latest unfused powder layer, which means that the thickness is free from embedded unfused powder layers.

In still another example embodiment of the present invention the means for altering the FWHM of the high energy beam is at least one of the group of: focus lens, astigmatism lens, vacuum level, grid potential of an electron beam source or an aperture size of a laser beam source. A non-limiting advantage of at least this embodiment is that various means may be used for altering the FWHM of the high energy beam independently of each other. Another non-limiting advantage of at least this embodiment is that a plurality of the means may be used simultaneously for enhancing the altering effect.

In yet another example embodiment of the present invention the function is a linear function or a polynomial function. A non-limiting advantage of at least this embodiment is that one may use different functions for different geometries and/or materials.

According to another aspect of the present invention it is provided method for forming a three-dimensional article through successively depositing individual layers of powder material that are fused together so as to form the article, the method comprising the steps of: providing at least one high energy beam source for emitting a high energy beam for at least one of heating or fusing the powder material; providing a deflection source for deflecting the high energy beam on the powder material; providing means for varying FWHM of the high energy beam; and varying the FWHM of the high energy beam as a function of an already fused thickness of the three-dimensional article below the powder which is to be fused, wherein the FWHM of the high energy beam is decreased for a decreased already fused thickness of the three dimensional article for counteracting an undesired widening of a melt pool when fusing the powder.

A non-limiting advantage of the present invention is that porosities for negative surfaces of built three-dimensional articles may be reduced or eliminated. Another advantage is that thinner overhangs may be built with the inventive focus spot variation as a function of the already fused thickness of the three-dimensional article below the layer of powder which is to be fused without any inclusions or porosity in the final product.

In an example embodiment of this invention the deflection source is at least one tiltable mirror or a tiltable lens if the high energy beam is a laser beam. In another example embodiment the deflection source is a deflection coil if the high energy beam is an electron beam. A non-limiting advantage of at least these embodiments is that the inventive method is equally applicable electron beam sources and laser beam sources.

In another example embodiment of the present invention a mean spot size on the workpiece in a direction perpendicular to the scanning direction is smaller than a mean spot size on the workpiece in a direction parallel to the scanning direction for a full scan length, a full cross section and/or for a full 3-dimensional article. A non-limiting advantage of at least this embodiment is that the mean spot size may be varied in a direction perpendicular to the scanning direction due to the thickness of the already fused powder layers independently of the varying of the spot size in a direction in parallel with the scanning direction.

In still another example embodiment pf the present invention the method further comprises the step of receiving and storing, within one or more memory storage areas, a model of the at least one three-dimensional article; and at least the step of varying the focus of the high energy beam is performed via execution of one or more computer processors. A non-limiting advantage of at least this embodiment is that the invention may be easily implemented in existing control units for controlling an additive manufacturing process.

In another aspect of the present invention it is provided a computer program product for forming a three-dimensional article through successively depositing individual layers of powder material that are fused together so as to form the article, the computer program product comprising at least one non-transitory computer-readable storage medium having computer-readable program code portions stored therein. The computer program product comprises: an executable portion configured to provide at least one high energy beam source for emitting a high energy beam for at least one of heating or fusing the powder material; an executable portion configured to provide a deflection source for deflecting the high energy beam on the powder material; an executable portion configured to provide a focus lens for focusing the high energy beam on the powder material; an executable portion configured to shape the high energy beam on the powder layer with at least one focus lens so that a spot size of the high energy beam on the powder bed is varied as a function of an already fused thickness of the three-dimensional article below the powder which is to be fused for counteracting an undesirable widening of a melt pool when fusing the powder.

According to another aspect of the present invention it is provided method for altering a spot size of a high energy beam in an additive manufacturing apparatus for forming a three-dimensional article through successive fusion of parts of at least one layer of powder provided on a work table, which parts correspond to successive cross sections of the three dimensional article. The method comprises the step of varying a Full Width Half Maximum (FWHM) of the high energy beam as a function of an already fused thickness of the three-dimensional article below the layer of powder which is to be fused, wherein the FWHM of the high energy beam is decreased for a decreased already fused thickness of the three dimensional article for counteracting an undesired widening of a melt pool when fusing the powder.

As a non-limiting example, in at least this embodiment, the varying step is performed by an element selected from the group consisting of: a focus lens, an astigmatism lens, a vacuum level, a grid potential of an electron beam source, or an aperture size of a laser beam source.

According to another aspect of the present invention it is provided method for forming a three-dimensional article through successively depositing individual layers of powder material that are fused together so as to form the article. The method comprises the steps of: providing at least one high energy beam source for emitting a high energy beam for fusing the powder material; providing a deflection source for deflecting the high energy beam on the powder material; providing at least one component configured for varying a Full Width Half Maximum (FWHM) of the high energy beam; and varying, via the at least one component, the FWHM of the high energy beam as a function of an already fused thickness of the three-dimensional article below the powder which is to be fused, wherein the FWHM of the high energy beam is decreased for a decreased already fused thickness of the three dimensional article for counteracting an undesired widening of a melt pool when fusing the powder.

As a non-limiting example, in at least this embodiment, the component configured for varying the FWHM is selected from the group consisting of: a focus lens, an astigmatism lens, a vacuum level, a grid potential of an electron beam source, or an aperture size of a laser beam source.

In another aspect of the present invention it is provided a computer program product for forming a three-dimensional article through successively depositing individual layers of powder material that are fused together so as to form the article, the computer program product comprising at least one non-transitory computer-readable storage medium having computer-readable program code portions stored therein. The computer-readable program code portions comprise: an executable portion configured to provide at least one high energy beam source for emitting a high energy beam for at least one of heating or fusing the powder material; an executable portion configured to provide a deflection source for deflecting the high energy beam on the powder material; an executable portion configured for providing a component arranged to vary a Full Width Half Maximum (FWHM) of the high energy beam; and an executable portion configured to, via the component, shape the high energy beam on the powder layer so that a spot size of the high energy beam on the powder bed is varied as a function of an already fused thickness of the three-dimensional article below the powder which is to be fused for counteracting an undesirable widening of a melt pool when fusing the powder.

As a non-limiting example, in at least this embodiment, the component is selected from the group consisting of: a focus lens, an astigmatism lens, a vacuum level, a grid potential of an electron beam source, or an aperture size of a laser beam source.

BRIEF DESCRIPTION OF THE SEVERAL VIEWS OF THE DRAWINGS

Figure 1A:
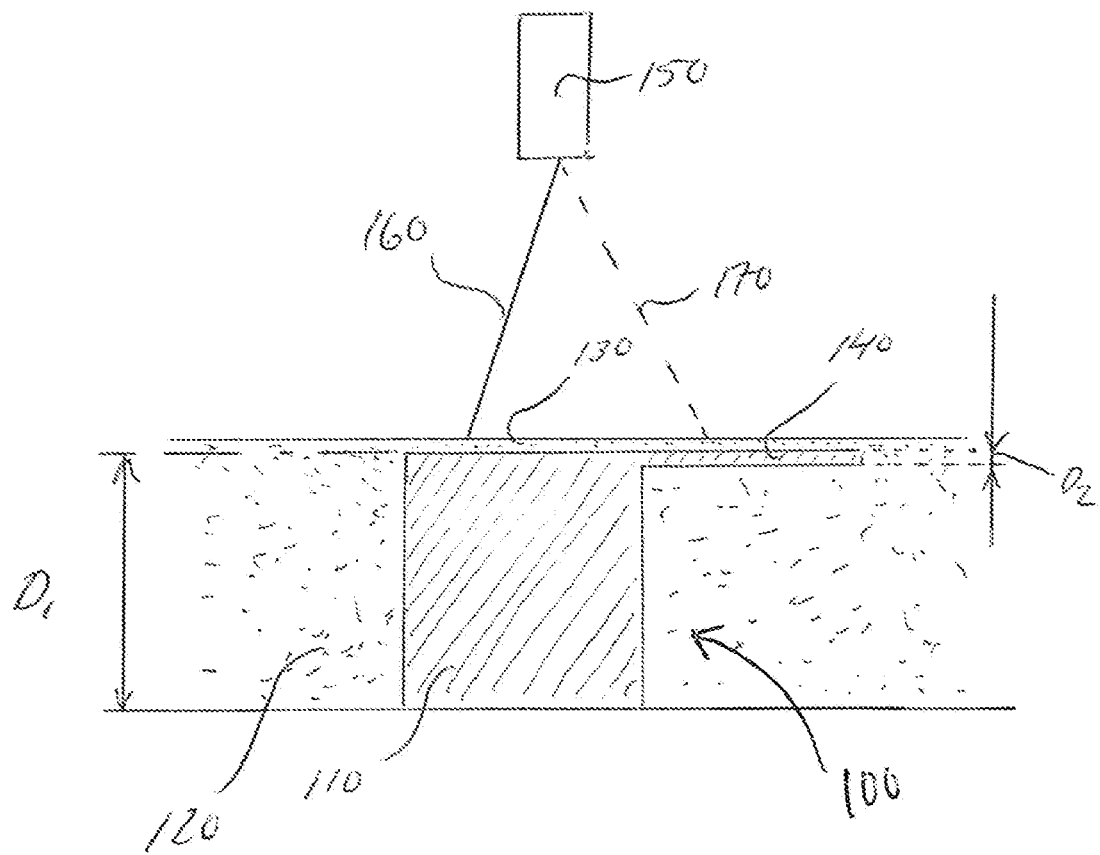
Figure 1B:
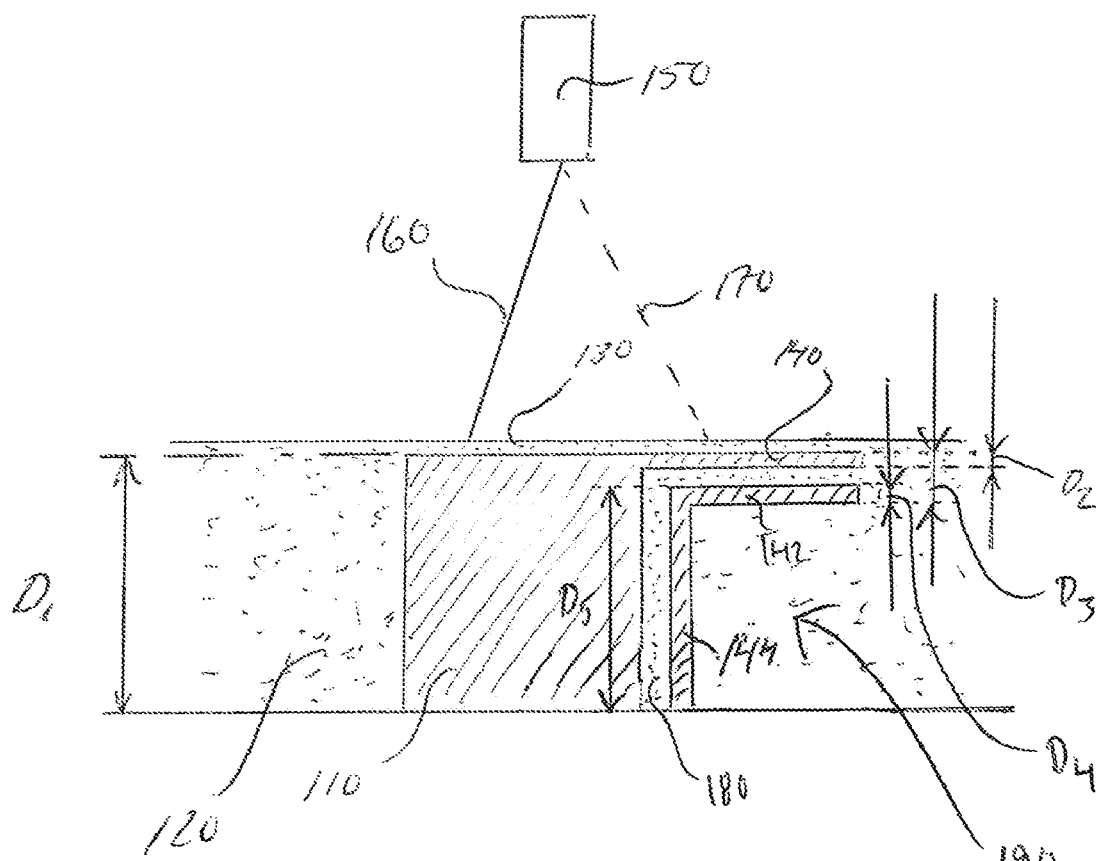
Figure 2:
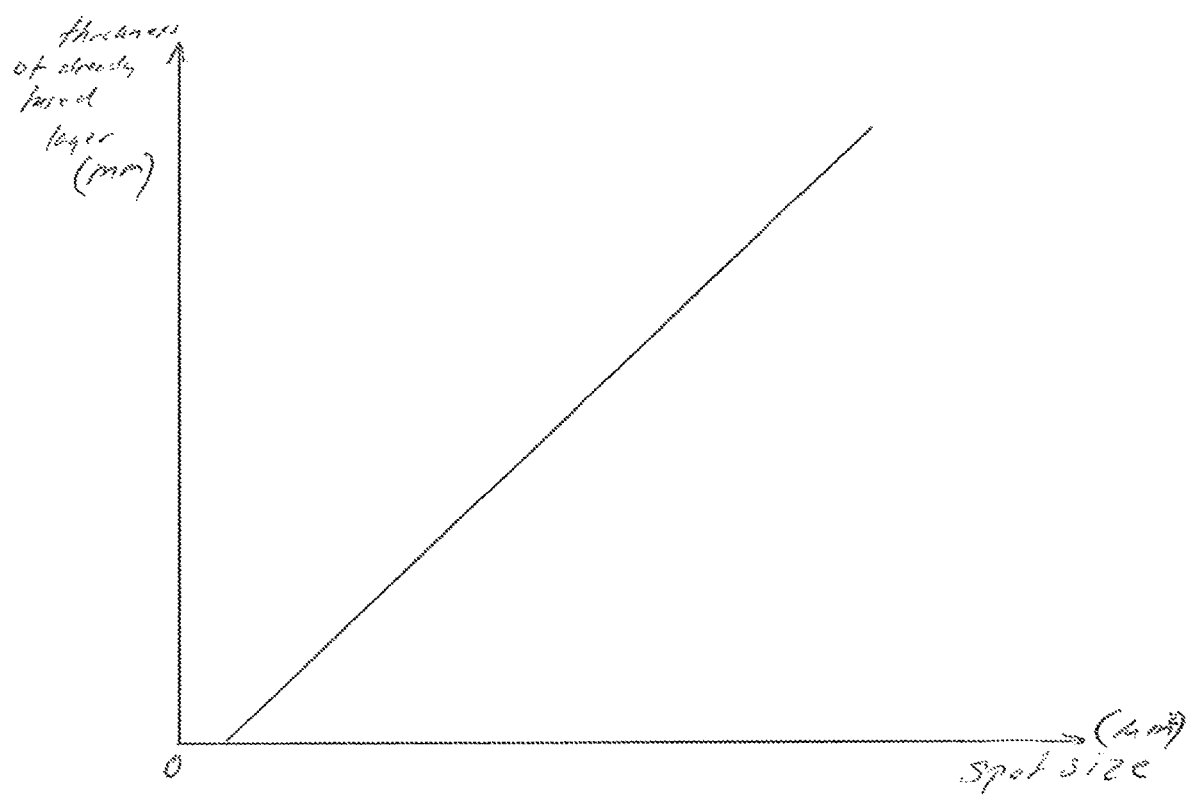
Figure 3:
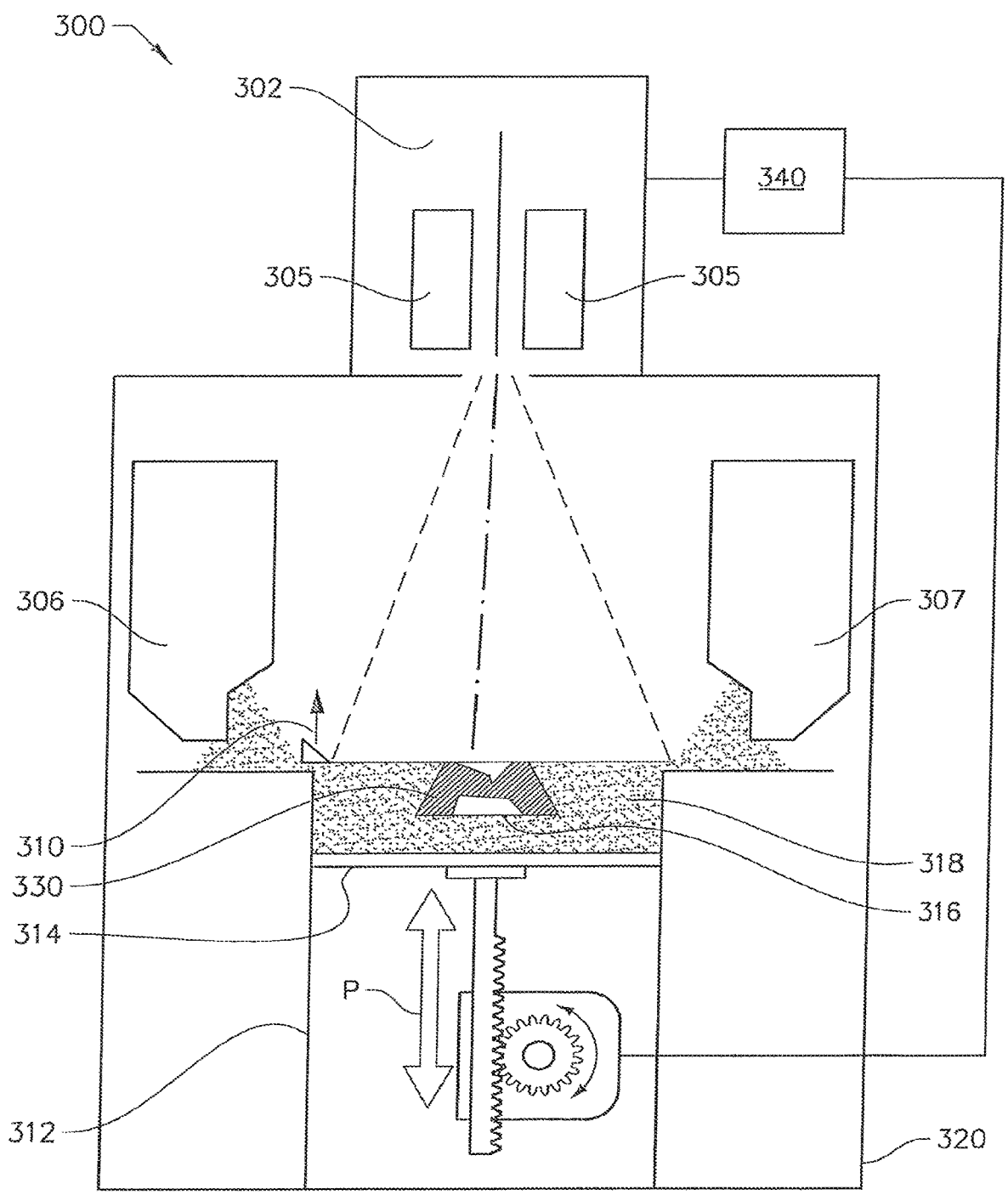
Figure 4:
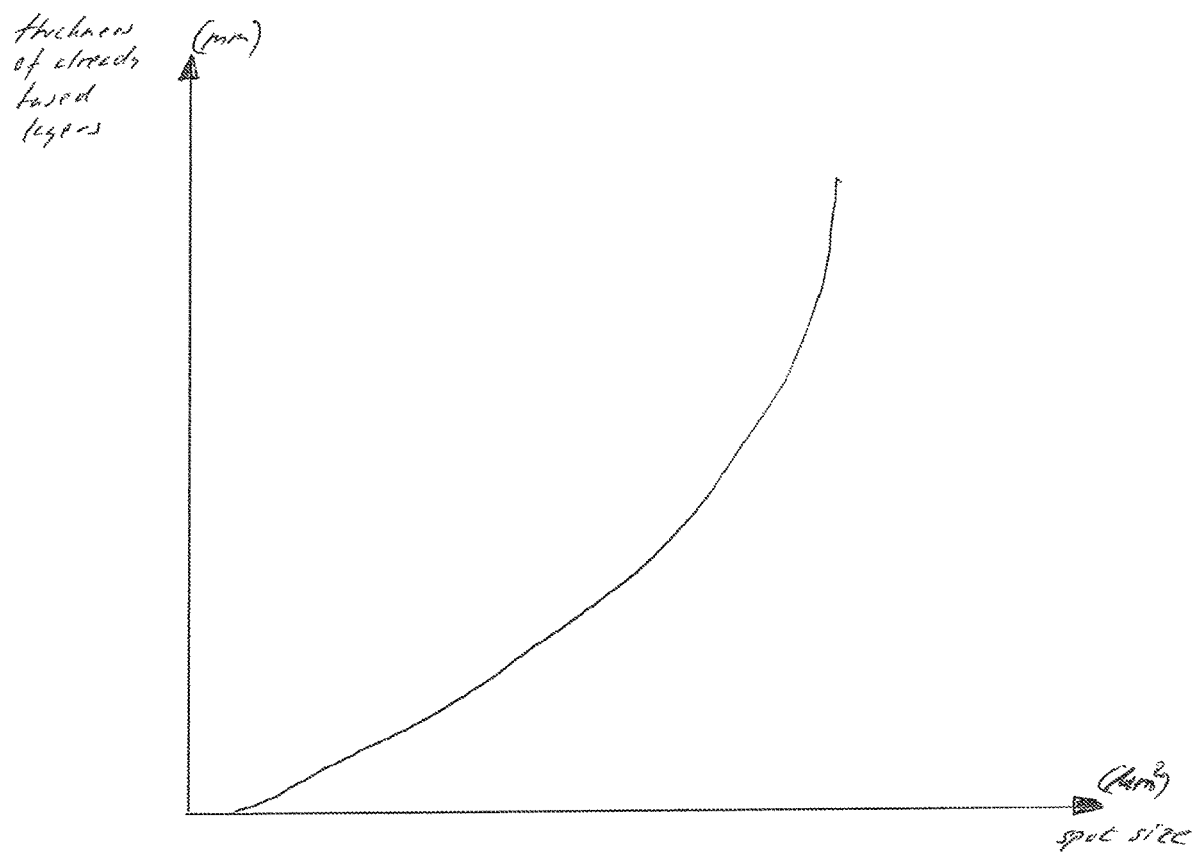
Figure 5:
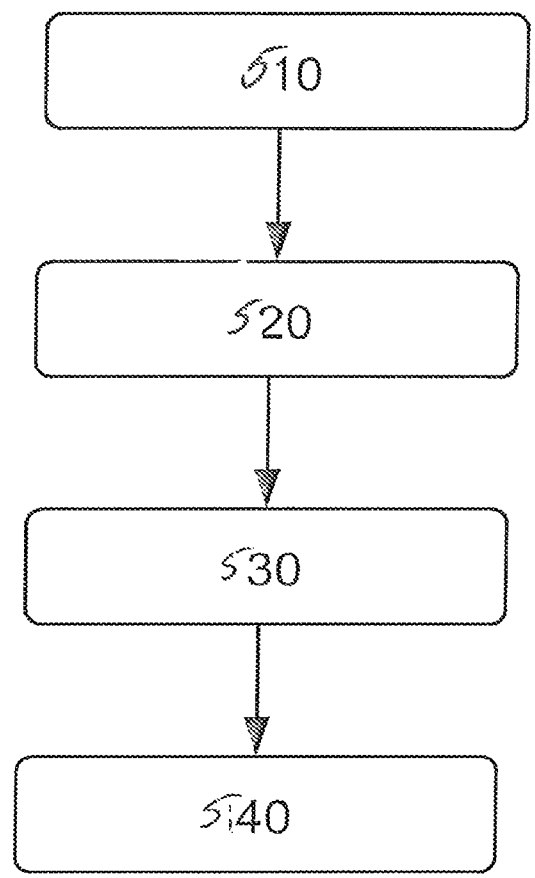
Figure 6:
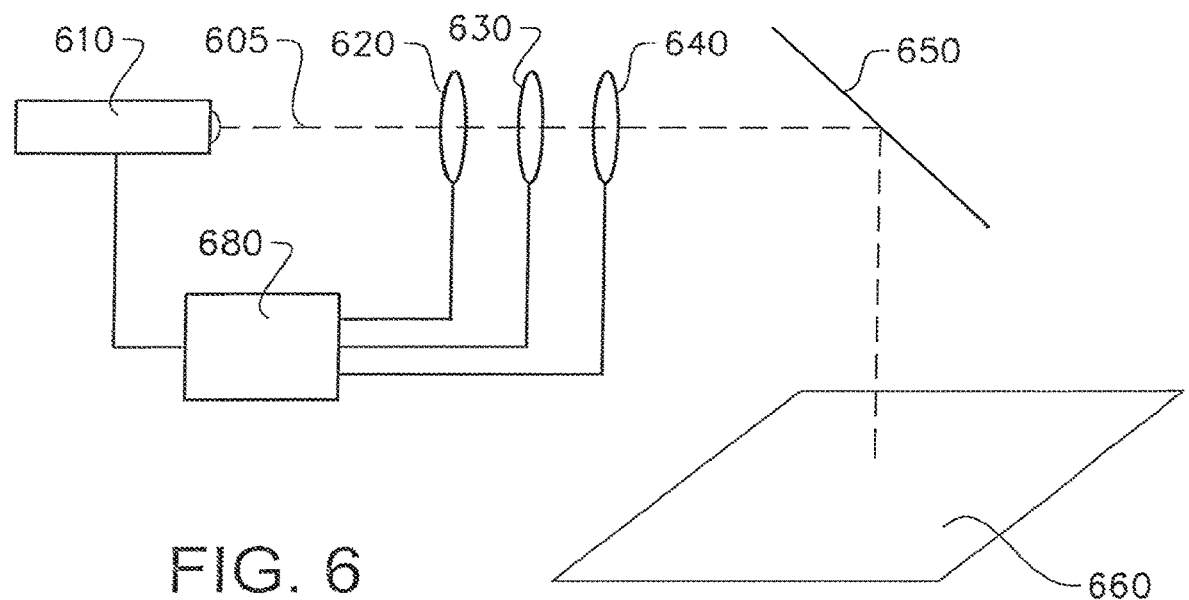
Figure 7:
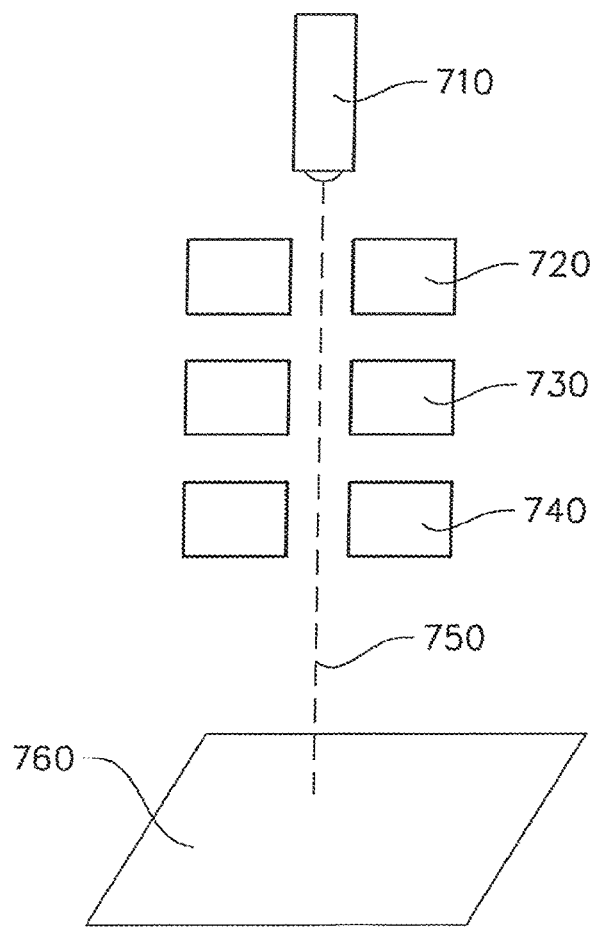
Figure 8:
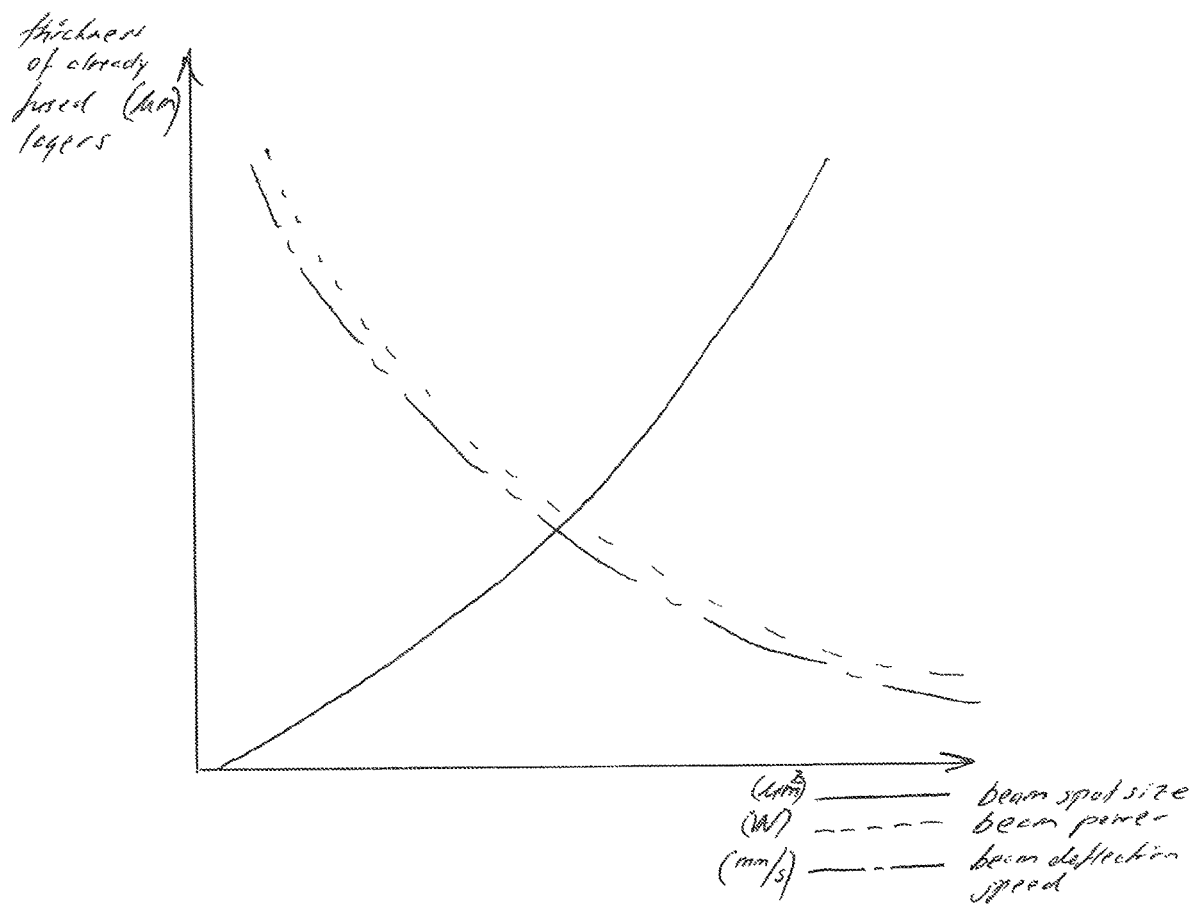
Figure 9:
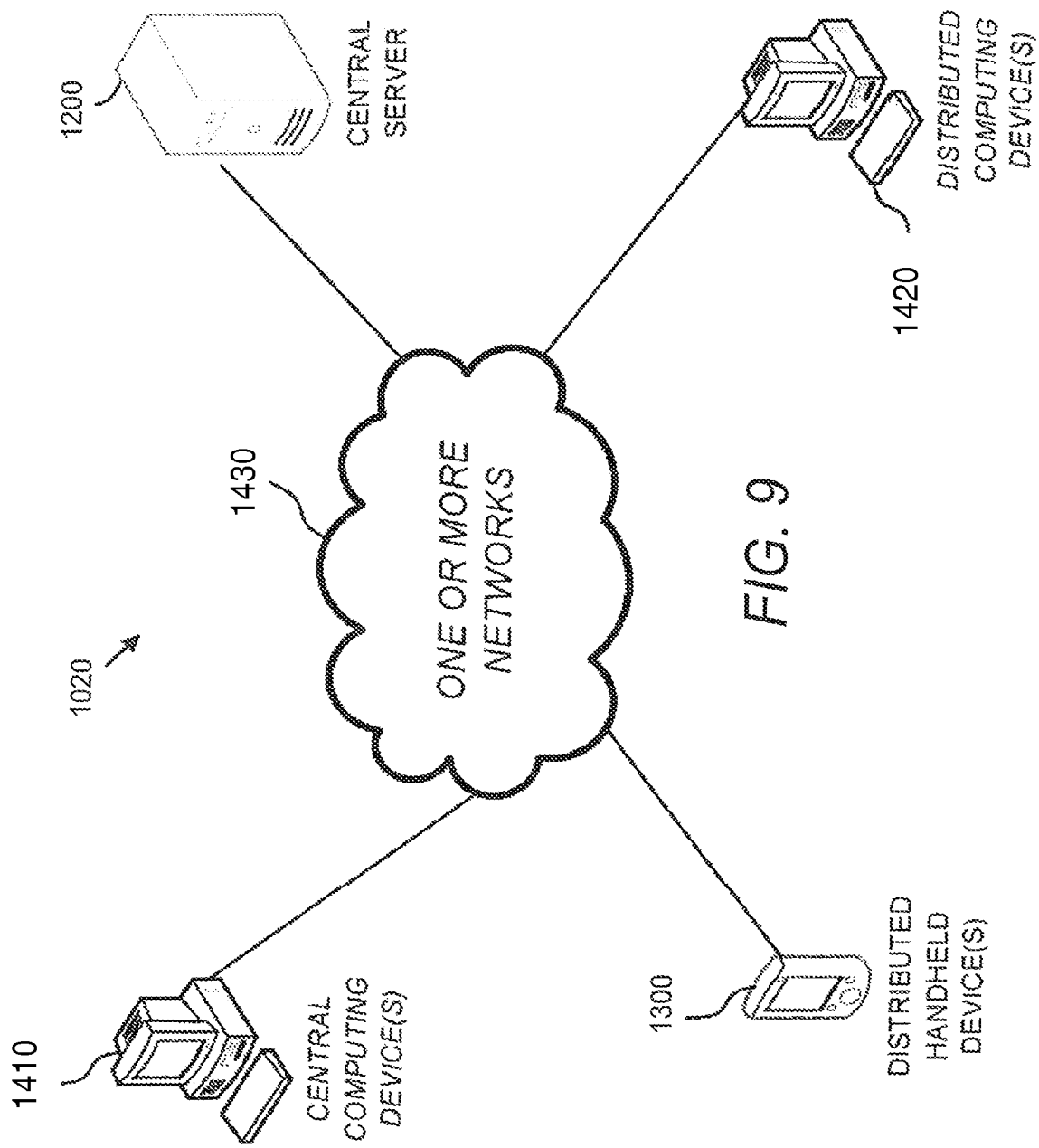
Figure 10A:
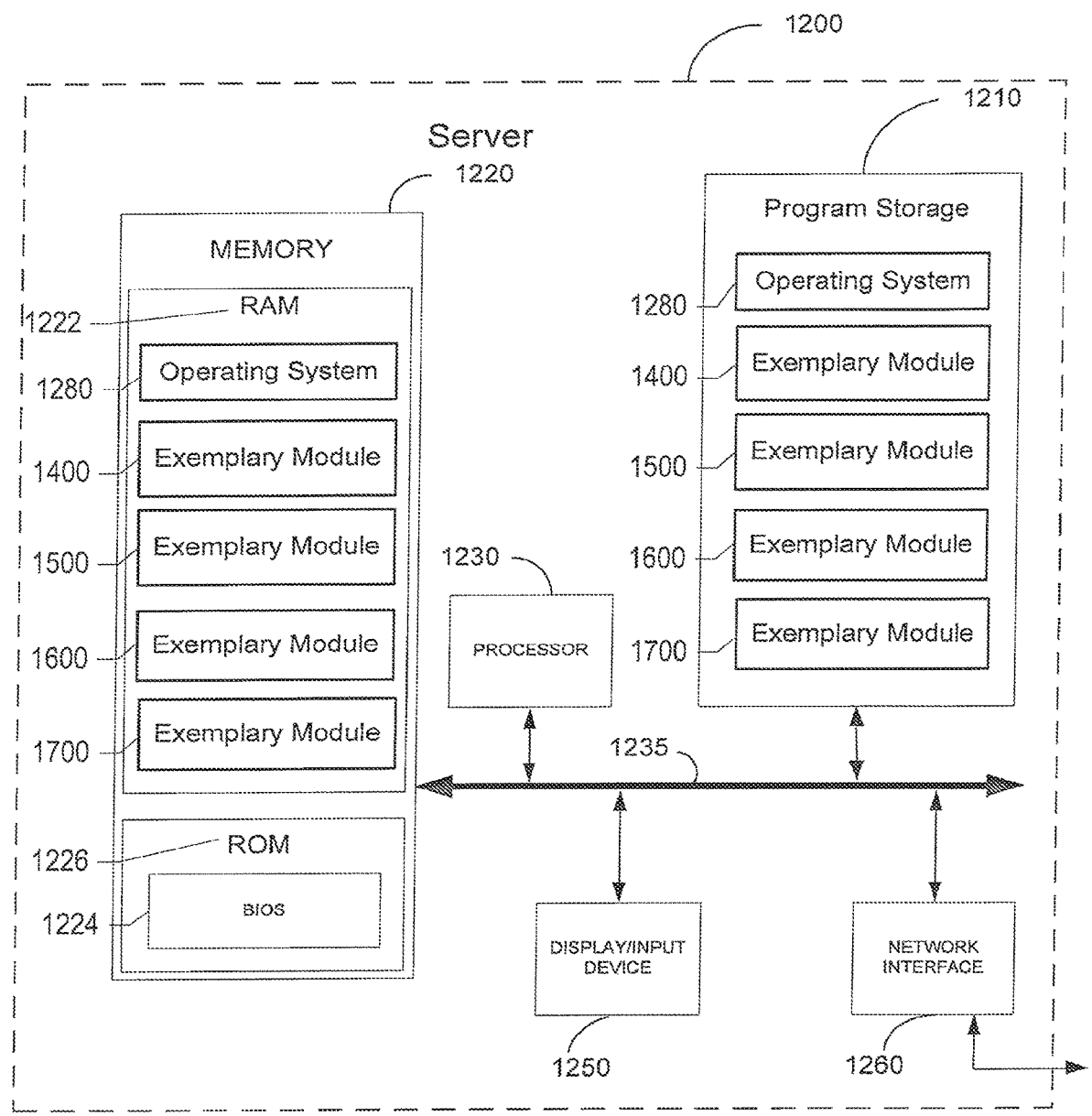
Figure 10B:
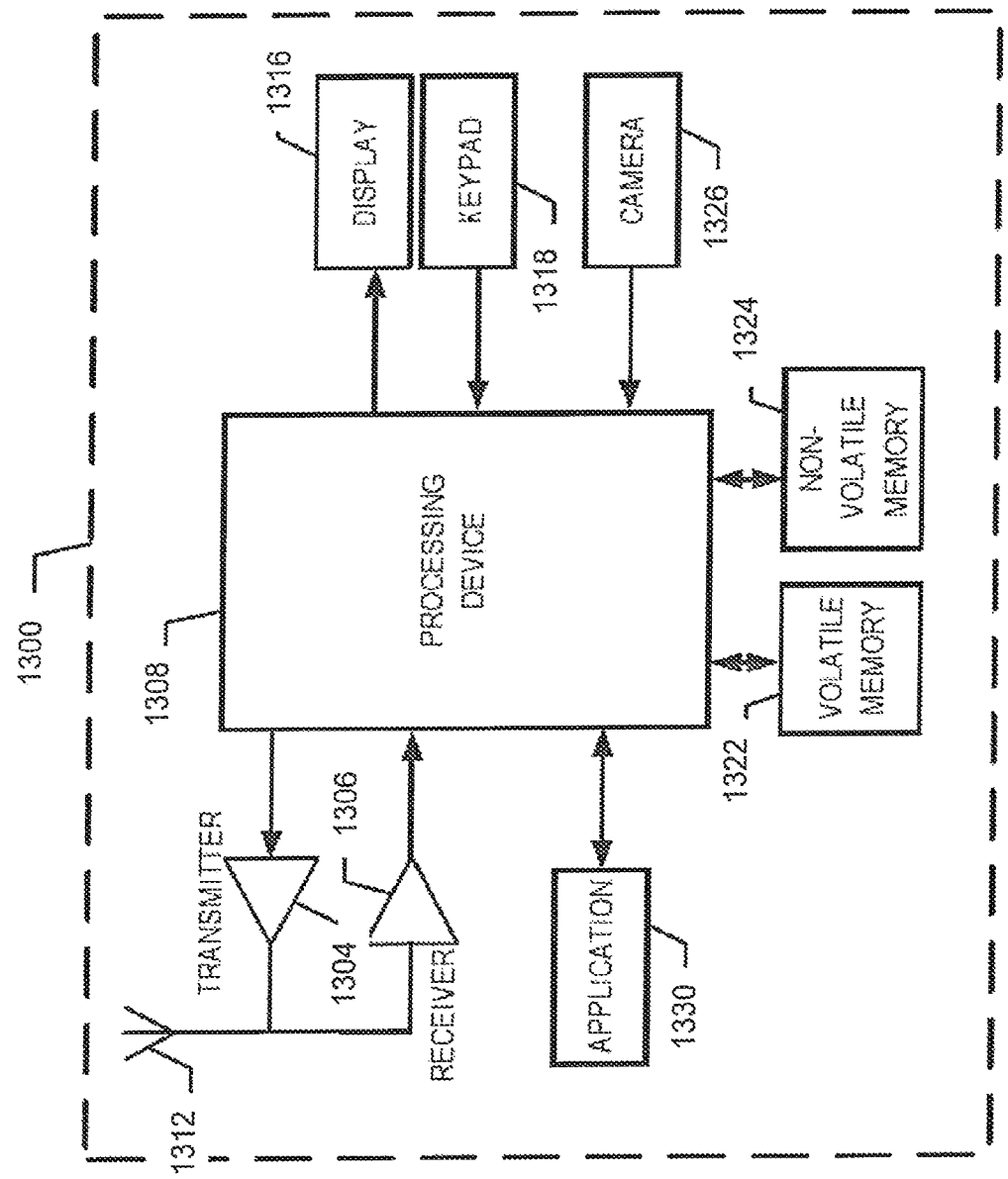
Figure 11A:
Figure 11B:
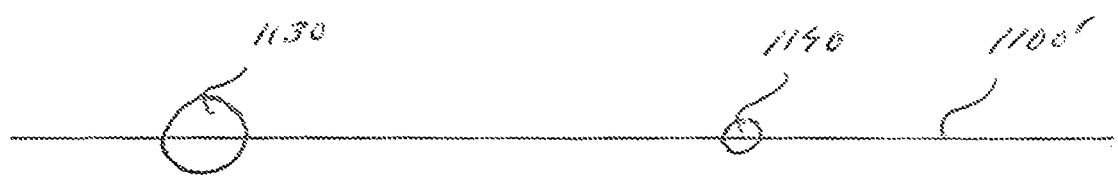

Having thus described the invention in general terms, reference will now be made to the accompanying drawings, which are not necessarily drawn to scale, and wherein:

FIGS. 1A-1B depict two different example embodiments of a schematic cross sections of an additively manufactured three-dimensional article;

FIG. 2 depicts a first example embodiment of a schematic graph of thickness of already fused layer as a function of spot size;

FIG. 3 depicts an example embodiment of a freeform fabrication or additive manufacturing apparatus in which the method may be implemented;

FIG. 4 depicts a second example embodiment of a schematic graph of thickness of already fused layer as a function of spot size;

FIG. 5 depicts a schematic flow chart of a method according to the present invention;

FIG. 6 depicts an example embodiment for accomplishing an appropriate beam spot shape in a laser beam based system;

FIG. 7 depicts an example embodiment for accomplishing an appropriate beam spot shape in an electron beam based system;

FIG. 8 depicts an example embodiment of a schematic graph of thickness of already fused layers as a function of beam spot size, beam powder and beam deflection speed;

FIG. 9 is a block diagram of an exemplary system 1020 according to various embodiments;

FIG. 10A is a schematic block diagram of a server 1200 according to various embodiments;

FIG. 10B is a schematic block diagram of an exemplary mobile device 1300 according to various embodiments; and FIGS. 11A-b depict two scan lines with different ways of varying the spot size.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

FIG. 3 depicts an embodiment of a freeform fabrication or additive manufacturing apparatus 300 in which the present method may be implemented. The apparatus 300 comprising an electron gun 302; two powder hoppers 306, 307; a control unit 340; a start plate 316; a build tank 312; a powder distributor 310; a build platform 314; beam managing optics 305; and a vacuum chamber 320.

The vacuum chamber 320 is capable of maintaining a vacuum environment by means of a vacuum system, which system may comprise a turbo-molecular pump, a scroll pump, an ion pump and one or more valves which are well known to a skilled person in the art and therefore need no further explanation in this context. The vacuum system is controlled by a control unit 340.

The electron gun 302 is generating an electron beam which is used for melting or fusing together powder material 318 provided on the start plate 316. The electron gun 302 may be provided in or in connection to the vacuum chamber 320. The control unit 340 may be used for controlling and managing the electron beam emitted from the electron beam gun 302. The beam managing optics 305 may comprise at least one focusing coil, at least one deflection coil and at least one astigmatism coil which may be electrically connected to the control unit 340. In an example embodiment of the invention the electron gun may generate a focusable electron beam with an accelerating voltage of about 60 kV and with a beam power in the range of 0-10 kW. The pressure in the vacuum chamber may be in the range of $1 \times 10^{-3}$-$1 \times 10^{-6}$ mBar when building the three-dimensional article by fusing the powder layer by layer with the energy beam.

Instead of using one or a plurality of electron beam sources one or a plurality of laser beam sources may be used for generating one or a plurality of laser beams for melting the powder material according to the present invention. If only using one or a plurality of laser beam sources the vacuum chamber 320 is optional.

The powder hoppers 306, 307 comprise the powder material to be provided on the start plate 316 in the build tank 312. The powder material may for instance be pure metals or metal alloys such as titanium, titanium alloys, aluminum, aluminum alloys, stainless steel, Co—Cr—W alloy, etc. Instead of using two powder hoppers one powder hopper may be used. In another example embodiment another known type of powder feed and/or powder storage may be used.

The powder distributor 310 is arranged to lay down a thin layer of the powder material on the start plate 316. During a work cycle the build platform 314 will be lowered successively in relation to the ray gun, electron beam based or laser beam based, after each added layer of powder material. In order to make this movement possible, the build platform 314 is in one embodiment of the invention arranged movably in vertical direction, i.e., in the direction indicated by arrow P. This means that the build platform 314 starts in an initial position, in which a first powder material layer of necessary thickness has been laid down on the start plate 316. The build platform 314 is thereafter lowered in connection with laying down a new powder material layer for the formation of a new cross section of a three-dimensional article 330. Means for lowering the build platform 314 may for instance be through a servo engine equipped with a gear, adjusting screws etc.

A three-dimensional article which is formed through successive fusion of parts of a powder bed, which parts corresponds to successive cross sections of the three-dimensional article, comprising a step of providing a model of the three dimensional article. The model may be generated via a CAD (Computer Aided Design) tool.

A first powder layer may be provided on the work table 316 by distributing powder evenly over the worktable according to several methods. One way to distribute the powder is to collect material fallen down from the hopper 306, 307 by a rake system. The rake is moved over the build tank thereby distributing the powder over the start plate. The distance between a lower part of the rake and the upper part of the start plate or previous powder layer determines the thickness of powder distributed over the start plate. The powder layer thickness can easily be adjusted by adjusting the height of the build platform 314.

An energy beam is directed over the work table 316 causing the first powder layer to fuse in selected locations to form a first cross section of the three-dimensional article. The energy beam may be one or a plurality of electron beams and/or one or a plurality of laser beams. The beam is directed over the work table 316 from instructions given by a control unit 340. In the control unit 340 instructions for how to control the energy beam for each layer of the three-dimensional article is stored.

After a first layer is finished, i.e., the fusion of powder material for making a first layer of the three-dimensional article, a second powder layer is provided on the work table 316. The second powder layer is preferably distributed according to the same manner as the previous layer. A powder distributor in the form of a single rake system, i.e., where one rake is catching powder fallen down from both a left powder hopper 306 and a right powder hopper 307, the rake as such can change design.

After having distributed the second powder layer on the work table 316, the energy beam is directed over the work table causing the second powder layer to fuse in selected locations to form a second cross section of the three-dimensional article. Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

FIG. 1A depicts a first example embodiment of a schematic cross sections of an additively manufactured three-dimensional article 100. The three dimensional article 100 comprises a first section 110 having a thickness D1 and a second section having a thickness D2, where D2<<D1. The three-dimensional article is embedded in unfused powder material 120. A new powder layer 130 which is to be fused is arranged on top of the three-dimensional article 100 and the unfused powder 120. The fusion of the new powder layer 130 is achieved with a high energy beam source 150. When a beam 160 from the high energy beam source 150 is arranged to fuse the powder layer above the first section 110 of the three-dimensional article 100, the beam 160 is having a first FWHM (Full Width Half Maximum). When a beam 170 from the high energy beam source 150 is arranged to fuse the powder layer above the second section 140 of the three-dimensional article 100, the beam 170 is having a second FWHM (Full Width Half Maximum).

The first FWHM of the first beam 160 is larger than the second FWHM of the second beam 170. The first beam 160 and the second beam 170 may emanate from one and the same high energy beam source 150, i.e., just different deflection settings. In another example embodiment the first beam 160 and the second beam 170 may emanate from two different high energy beam sources. The high energy beam source may be a laser beam source and/or an electron beam source. If using multiple high energy beam sources they may be of the same type or different types, e.g., at least one laser beam source and at least one electron beam source. In another example embodiment the high energy beam sources may be of the same type but may have different characteristics, e.g., a first electron beam source having a first type of electron emission element and a second electron beam source having a second electron emission element.

In FIG. 1A the first part 110 of the three-dimensional article 100 is having a larger thickness compared to the second section 140. The FWHM of the high energy beam is according to the invention larger for a larger already fused thicknesses of the three dimensional article 100. For this reason the FWHM of the second high energy beam 170 is smaller for the second portion 140 than the FWHM of the first high energy beam 160 for the first portion 110. The reduction of FWHM for reduced thicknesses of already fused layers of the three-dimensional article 100 has proven to counteract undesired widening of a melt pool when fusing the powder layer 130. The reason is that the thermal conductivity of unfused powder layer is lower than for already fused sections. If a thin portion, e.g. the second section 140, of the three dimensional article 100 is to be formed, heat from the high energy beam tends to be reflected back by the unfused powder 120. This back reflection of the heat may widen the meltpool, which may cause undesirable effects such as porosities, dimension changes and/or altered microstructures.

FIG. 2 depicts schematically a graph of thickness of already fused layer as a function of spot size or FWHM. From FIG. 2 one can see that the spot size increases linearly as a function of increased thickness of already fused layer in the three-dimensional article. Alternatively, as depicted in FIG. 4, the thickness of already fused layer as a function of spot size is non-linear. In FIG. 4 the spot size will reach a maximum dimension for a predetermined thickness of already fused layers, which maximum dimension of the spot will be used for the rest of the layers of the three-dimensional article. In additive manufacturing the area of the beam spot may be in $\mu m^2$ range.

In various example embodiments the beam spot size may be varied along a scan line as a function of an already fused thickness of the three-dimensional article below the powder which is to be fused.

FIG. 1B depicts a second example embodiment of a schematic cross sections of an additively manufactured three-dimensional article 190. The three dimensional article 190 comprises a first section 110 having a thickness D1, a second section 140 having a thickness D2, a third section 142 having a thickness D4 and a fourth section 144 having a thickness D5. A narrow channel 180 is separating the first and second sections 100 and 140 respectively from the third and fourth sections 142 and 144 respectively.

As in FIG. 1A D2<<D1. Additionally, in FIG. 1B D3<<D1, D4<<D1, D2<<D5, D3<<D5, D4<D5.

The three-dimensional article 190 is embedded in unfused powder material 120. A new powder layer 130 which is to be fused is arranged on top of the three-dimensional article 100 and the unfused powder 120. The fusion of the new powder layer 130 is achieved with a high energy beam source 150. When a beam 160 from the high energy beam source 150 is arranged to fuse the powder layer above the first section 110 of the three-dimensional article 100, the beam 160 is having a first FWHM (Full Width Half Maximum). When a beam 170 from the high energy beam source 150 is arranged to fuse the powder layer above the second section 140 of the three-dimensional article 100, the beam 170 may have a second or a third FWHM (Full Width Half Maximum).

The second FWHM is identical as in FIG. 1A because it is related to the thickness of the second section 140 only. The third FWHM is related to a thickness D3 which is the sum of the thickness D2, D4 and the narrow channel 180. The third FWHM may be used for areas where the second section 140 is overlapping with the third section 142. The second FWHM may be used where the second section 140 is not overlapping the third section 142, i.e., the second section 140 is only overlapping the narrow channel 180. The thickness of the three-dimensional article may be the total number of powder layers which have been fused including unfused layers, e.g., D3. Alternatively the thickness of the three-dimensional article may be the uninterrupted total number of powder layers which have been fused, i.e., the thickness does not contain any unfused powder layer, e.g., D2. The bottom surface of the second section 140, and a bottom surface of the third section 142 are examples of negative surfaces.

Different FWHM may emanate from the same or different high energy beam sources in the same manner as disclosed in relation with FIG. 1A.

FIG. 5 depicts a schematic flow chart of a method for forming a three-dimensional article through successively depositing individual layers of powder material that are fused together so as to form the article according to the present invention.

In a first step denoted 510 at least one high energy beam source is providing for emitting a high energy beam for fusing the powder material. The high energy beam source may be at least one electron beam source and/or at least one laser beam source.

In a second step denoted 520 a deflection source is provided for deflecting the high energy beam on the powder material. An electron beam may be deflected by one or a plurality of deflection coils. A laser beam may be deflected by one or a plurality of tiltabe lenses or tiltable mirrors.

In a third step denoted 530 means is provided for varying FWHM of the high energy beam. The means for varying the FWHM of an electron beam may be one or a plurality of focus coils, one or a plurality of astigmatism coils. The electron beam FWHM may also be varied by varying a vacuum level, a higher pressure in the vacuum chamber tends to diverge the electron beam. The electron beam FWHM may also be varied by varying a grid potential in a triod electron beam emitting design. An increased grid potential may decrease the FWHM of the electron beam.

For a laser beam a focus lens and/or an astigmatism lens may be used for varying the FWHM. The FWHM of a laser beam may also be varied by varying an aperture size arranged in the optical path between a laser beam source and the target.

In a fourth step denoted 540 the FWHM is varied of the high energy beam as a function of an already fused thickness of the three-dimensional article below the powder which is to be fused, wherein the FWHM of the high energy beam is decreased for a decreased already fused thickness of the three dimensional article for counteracting an undesired widening of a melt pool when fusing the powder. The thinner the layer is which is to be fused, the smaller the FWHM of the high energy beam needs to be in order to achieve desired material characteristics. As the thickness of the already fused three-dimensional article is increasing the FWHM is increased. The thickness of the already fused layers of powder material may vary as a function of the FWHM or beam spot size in a linear fashion or in a polynomial fashion.

In an example embodiment the FWHM is constant above a predetermined thickness of already fused powder layers.

For beam powers lower than a predetermined value an essentially circular beam spot may be used for fusing powder material. If increasing the beam power over a predetermined value, and thereby increasing the scan speed over a predetermined value, the material may start to boil instead of melt. The reason for this boiling of material is that the deflection or scan speed of the energy beam will be too fast so that the heat from the energy beam will not have sufficient time to penetrate into the material to be fused. With a too high power and thereby a too fast speed of deflection of the energy beam, the surface temperature will become too high so that the material which is to be fused is instead evaporated.

The evaporation problem may be solved by protracting the spot, i.e., extending the spot dimension parallel to the scan direction and essentially keeping its dimension perpendicular to the scan direction. For beam power and scan speed above predetermined values the beam spot may be protracted in the direction parallel to the scan direction. By letting the beam spot being protracted parallel to the scan direction the surface temperature may be decreased since the power in the beam is distributed over a larger area. The heat from the beam spot may, because of this beam power distribution over a larger area, have sufficient time to penetrate into the material and thereby minimizing the radiated energy from the melt pool and thereby minimizing the boiling or evaporation of material. By protracting the beam spot in parallel to the scan direction, larger beam powers may be used compared to if a circular spot would have been used with a maintained resolution of the fusing or welding. The protracted beam spot may follow an intended scanning path so that the longer dimension of the beam spot follows the beam path, i.e., the dimension perpendicular to the scanning direction is smaller than the dimension parallel to the scanning direction irrespective of the direction of the intended beam path.

FIG. 6 depicts an example embodiment of beam management optics in a laser beam based system. A laser beam 605 is emanating from a laser beam source 610. Before reaching a target surface 660 which may be a powder layer in a layer based additive manufacturing process, the laser beam 605 is passing through an astigmatism lens system 620, a focusing lens system 630, a deflection lens system 640, and an optional reflective surface 650. A control unit 680 may be controlling the laser beam source 610 and the lens systems 620, 630, 640. The focusing lens 630 system may comprise one or a plurality of lenses which may be rotatable and/or tiltable and/or translatable (movable along the optical axis) with respect to an optical axis. The focusing lens system 630 may be creating a predetermined beam spot size on the target surface 660. The lenses in the focusing lens system 630 may be fully or partially transparent. The deflection lens system 640 may comprise one or a plurality of lenses which may be rotatable and/or tiltable and/or translatable (movable along the optical axis) with respect to an optical axis. The deflection lens system 640 may position the beam spot at any predetermined position within given limitations, which are defined by the maximum deflection of the beam spot, at the target surface 660.

The focus lens system 630 may alter the size of the laser beam. The size of the laser beam may vary as a function of the already fused thickness of the three-dimensional article as described hereinabove.

The astigmatism lens system 620 may comprise one or a plurality of lenses which may be rotatable and/or tiltable and/or translatable (movable along the optical axis) with respect to an optical axis. When a beam is deflected certain aberrations are introduced into the beam spot which is depending on the degree of deflection. The beam is more or less distorted depending on the degree of deflection which may be compensated by the astigmatism lens system 620. The astigmatism lens system 620 may intentionally distort the beam spot shape so as to protract the beam spot in a direction parallel to the direction of beam deflection. The degree of protraction in the direction parallel to the deflection direction may at least be depending on the beam power of the energy beam.

FIG. 7 depicts an example embodiment of beam management optics in an electron beam based system. An electron beam 750 is emanating from an electron beam source 710. Before reaching a target surface 760, which may be a powder layer in a layer based additive manufacturing process, the electron beam 750 may be passing through an astigmatism lens system 720, a focusing lens system 730, an deflection lens system 740. A control unit 680 may control the electron beam source and the beam shaping optics. The focusing lens system 730 may comprise one or a plurality of focusing coils. The focusing lens system 730 may create a predetermined beam spot size on the target surface 760.

The deflection lens system 740 may comprise one or a plurality of deflection coils. The deflection lens system 740 may position the beam spot at any predetermined position within given limitations, which are defined by the maximum deflection of the beam spot, at the target surface 760.

The astigmatism lens system 720 may comprise one or a plurality of astigmatism coils. When a beam is deflected certain aberrations is introduced into the beam spot which is depending on the degree of deflection. The beam may be more or less distorted depending on the degree of deflection which may be compensated by the astigmatism lens system 720. The beam spot may not only be compensated for distortions, which may be introduced by the other lens systems, but the astigmatism lens system 720 may also intentionally distort the beam spot shape so as to protract the beam spot in a direction parallel to the direction of beam deflection. The degree of protraction in the direction parallel to the deflection direction may at least be depending on the beam power of the energy beam. In an example embodiment the beam spot shape may be protracted parallel to the deflection direction as a linearly function of the beam power above a predetermined beam power. In another example embodiment the beam spot shape may be protracted parallel to the deflection direction as a polynomial function of the beam power above a predetermined beam power. In an example embodiment a plurality of astigmatism lenses may be used for generating an arbitrary orientation of the protracted beam in any position of the workpiece.

The focus lens system 730 may alter the size of the electron beam. The size of the electron beam may vary as a function of the already fused thickness of the three dimensional article as described hereinabove. The size of the electron beam may be, in certain embodiments, indicative of a degree of focus of the beam. For example, a larger sized beam spot may be indicative of a relatively out of focus beam, and vice-versa for a relatively small beam spot. Where described elsewhere herein that the FWHM may decrease as the thickness of the article is decreased (and vice-versa), it should be understood that the focus will in an analogous fashion decrease (grow further out of focus) as the thickness of the fused article layers increases. Stated otherwise, the most focused (e.g., a perfect focus) beam may be provided for fusing of an initial layer—corresponding to the thinnest profile of the three-dimensional article (as no prior fused thickness exists), with the focus being diminished as the thickness of fused layers increases over time (e.g., as the process of fusing successive layers progresses). The state of "perfect focus" as mentioned above corresponds to a state of maximum distinctness, sharpness, or clarity in the beam and/or beam spot produced thereby.

In a laser beam based and electron beam based system the protraction parallel to the deflection direction may not only depend on the power of the energy beam but also on the position on the target surface. More particularly the protraction of the energy beam may depend, in addition to the energy beam power, on the actual fusing or welding position of the energy beam spot on the target surface. In an additive manufacturing process, the protraction may depend on the actual position of the energy beam spot with respect to the pattern which is to be fused, i.e., a more protracted beam spot may be used in the middle section of a scan length compared to at the start or stop position of the scan line. If melting a contour the protraction may be altered during the melting of the contour depending on the derivate of the contour and the distance to the contour derivate. In an example embodiment the protraction, power and scan speed of the beam spot on the workpiece may be chosen so as to optimize the build time.

In an example embodiment of the present invention a mean spot size on the workpiece in a direction perpendicular to the scanning direction is smaller than the mean spot size on the workpiece in a direction parallel to the scanning direction for a full scan length, a full cross section and/or for a full 3-dimensional article.

The above disclosed protraction and the FWHM variation as a function of already fused thicknesses of the three-dimensional article may be combined.

Fusing with a protracted beam spot may have the effect of using higher beam spot power and higher beam scanning speed. A protracted beam spot may decrease the surface temperature for a given scanning speed compared with a circular spot having the same power and a diameter equal to the smaller dimension of the protracted beam spot. A protracted beam spot may allow for a higher scanning speed with preserved resolution in a direction perpendicular to the scanning direction compared with a circular spot having a diameter equal to the smaller dimension of the protracted beam spot. A protracted beam spot may allow for heat to penetrate into the material instead of evaporating the material as may be the case with a circular spot. A protracted beam spot may decrease the manufacturing time for an additively manufactured 3-dimensional article compared with a circular spot having the same power and a diameter equal to the smaller dimension of the protracted beam spot.

FIG. 11A depicts a view from above of a scan line 1100 with different beam spot size along the scan line. A first beam spot 1110 is protracted in a direction along the scan direction which is along the scan line 1100. A second beam spot 1120 is essentially circular. The dimension in a direction perpendicular to the scan direction is equal for the first and second beam spot 1110 and 1120 respectively. The second beam spot 1120 may be used for melting powder layers on top of relatively thin already fused thickness of the three dimensional article. The first beam spot 1110 may be used for melting powder layers on top of relatively thick already fused thickness of the three dimensional article.

FIG. 11B depicts a view from above of a scan line 1100' with different beam spot size along the scan line. A first beam spot 1130 is essentially circular with a first diameter. A second beam spot 1140 is essentially circular with a second diameter, where the second diameter<first diameter. The dimension in a direction perpendicular to the scan direction is in this embodiment varying for the first and second beam spot 1130 and 1140 respectively. The second beam spot 1140 may be used for melting powder layers on top of relatively thin already fused thickness of the three dimensional article. The first beam spot 1130 may be used for melting powder layers on top of relatively thick already fused thickness of the three dimensional article.

FIG. 8 depicts a schematic graph of another example embodiment of the present invention where a beam spot size, a beam power and/or a beam deflection speed is varied as a function of a thickness of already fused layers of the three-dimensional article. For further improving the material characteristics of the final three-dimensional article not only the beam spot size may be varied as a function of the thickness of already fused layers of the three-dimensional article but also beam power and/or beam deflection speed may be varied as a function of the thickness of already fused layers of the three-dimensional article. A combination of a variation of beam spot size, beam powder and beam deflection speed as a function of the thickness of already fused layers is not only increasing the input parameters for making it possible to achieve desired material characteristics. A combination of two or three of the input parameters may also give combination effects which is larger than the sum of its individual effect.

In another aspect of the invention it is provided a program element configured and arranged when executed on a computer to implement a method for forming at least one three-dimensional article through successive fusion of parts of a powder bed, which parts correspond to successive cross sections of the three-dimensional article, the method comprising the steps of: providing at least one high energy beam source for emitting a high energy beam for fusing the powder material; providing a deflection source for deflecting the high energy beam on the powder material; providing means for varying FWHM of the high energy beam; and varying the FWHM of the high energy beam as a function of an already fused thickness of the three-dimensional article below the powder which is to be fused, wherein the FWHM of the high energy beam is decreased for a decreased already fused thickness of the three dimensional article for counteracting an undesired widening of a melt pool when fusing the powder.

The program element may be installed in a computer readable storage medium. The computer readable storage medium may be any control unit as described elsewhere herein or another separate and distinct control unit. The computer readable storage medium and the program element, which may comprise computer-readable program code portions embodied therein, may further be contained within a non-transitory computer program product. Further details regarding these features and configurations are provided, in turn, below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

FIG. 9 is a block diagram of an exemplary system 1020 that can be used in conjunction with various embodiments of the present invention. In at least the illustrated embodiment, the system 1020 may include one or more central computing devices 1410, one or more distributed computing devices 1420, and one or more distributed handheld or mobile devices 1300, all configured in communication with a central server 1200 (or control unit) via one or more networks 1430. While FIG. 9 illustrates the various system entities as separate, standalone entities, the various embodiments are not limited to this particular architecture.

According to various embodiments of the present invention, the one or more networks 1430 may be capable of supporting communication in accordance with any one or more of a number of second-generation (2G), 2.5G, third-generation (3G), and/or fourth-generation (4G) mobile communication protocols, or the like. More particularly, the one or more networks 1430 may be capable of supporting communication in accordance with 2G wireless communication protocols IS-136 (TDMA), GSM, and IS-95 (CDMA). Also, for example, the one or more networks 1430 may be capable of supporting communication in accordance with 2.5G wireless communication protocols GPRS, Enhanced Data GSM Environment (EDGE), or the like. In addition, for example, the one or more networks 1430 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 1020 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1200, 1300, 1410, 1420 are illustrated in FIG. 9 as communicating with one another over the same network 1430, these devices may likewise communicate over multiple, separate networks.

According to one embodiment, in addition to receiving data from the server 1200, the distributed devices 1410, 1420, and/or 1300 may be further configured to collect and transmit data on their own. In various embodiments, the devices 1410, 1420, and/or 1300 may be capable of receiving data via one or more input units or devices, such as a keypad, touchpad, barcode scanner, radio frequency identification (RFID) reader, interface card (e.g., modem, etc.) or receiver. The devices 1410, 1420, and/or 1300 may further be capable of storing data to one or more volatile or non-volatile memory modules, and outputting the data via one or more output units or devices, for example, by displaying data to the user operating the device, or by transmitting data, for example over the one or more networks 1430.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1410, 1420, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

FIG. 10A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which preferably includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1430, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1410, 1420, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1430. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

FIG. 10B provides an illustrative schematic representative of a mobile device 1300 that can be used in conjunction with various embodiments of the present invention. Mobile devices 1300 can be operated by various parties. As shown in FIG. 10B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1410, 1420, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

The invention is not limited to the above-described embodiments and many modifications are possible within the scope of the following claims. Such modifications may, for example, involve using a different source of energy beam than the exemplified electron beam such as a laser beam. Other materials than metallic powder may be used, such as the non-limiting examples of: electrically conductive polymers and powder of electrically conductive ceramics. Indeed, a person of ordinary skill in the art would be able to use the information contained in the preceding text to modify various embodiments of the invention in ways that are not literally described, but are nevertheless encompassed by the attached claims, for they accomplish substantially the same functions to reach substantially the same results. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for forming a three-dimensional article through successively depositing individual layers of powder material that are fused together so as to form the article, said method comprising the steps of:
   providing at least one high energy beam source for emitting a high energy beam for fusing said powder material;
   providing a deflection source for deflecting the high energy beam on said powder material to provide a protracted beam spot movable over an intended scanning path in a scanning direction used for fusing said powder material;
   providing means for varying FWHM of said high energy beam;
   determining whether an already fused thickness of said three-dimensional article below said powder which is to be fused exceeds a predetermined thickness; and
   varying said FWHM of said high energy beam only if said determined already fused thickness is less than the predetermined thickness,
   wherein said varying of said FWHM of said high energy beam involves decreasing said FWHM for a decreased already fused thickness of said three dimensional article, and
   a mean spot size of the protracted beam spot on said workpiece in a direction perpendicular to the scanning direction is smaller than a mean spot size of the protracted beam spot on said workpiece in a direction parallel to the scanning direction for a full scan length, a full cross section and/or for a full 3-dimensional article.

2. The method according to claim 1, wherein said thickness of said three-dimensional article is the thickness directly below a spot of said high energy beam on said layer of powder.

3. The method according to claim 1, wherein said thickness is a total number of powder layers which have been fused.

4. The method according to claim 1, wherein said thickness is the uninterrupted total number of powder layers which have been homogenously fused together.

5. The method according to claim 1, wherein said means for altering said FWHM of said high energy beam is selected from at least one of the group consisting of: a focus lens, an astigmatism lens, a vacuum level, a grid potential of an electron beam source, or an aperture size of a laser beam source.

6. The method according to claim 1, further comprising the step of varying at least one of a deflection speed or the beam power of said energy beam based upon the determined already fused thickness of said three-dimensional article below said powder which is to be fused.

7. The method according to claim 1, wherein said high energy beam is at least one of an electron beam or a laser beam.

8. The method according to claim 1, wherein said deflection source is at least one of a tiltable mirror or a tiltable lens.

9. The method according to claim 1, wherein said deflection source is a deflection coil.

10. The method according to claim 1, wherein:
the method further comprises the step of receiving and storing, within one or more memory storage areas, a model of said at least one three-dimensional article; and
at least the step of varying the FWHM of the high energy beam is performed via execution of one or more computer processors.

11. A method for forming a three-dimensional article through successively depositing individual layers of powder material that are fused together so as to form the article, said method comprising the steps of:
providing at least one high energy beam source for emitting a high energy beam for fusing said powder material;
providing a deflection source for deflecting the high energy beam on said powder material to provide a protracted beam spot movable over an intended scanning path in a scanning direction used for fusing said powder material;
providing means for varying a degree of focus of said high energy beam;
determining whether an already fused thickness of said three-dimensional article below said powder which is to be fused exceeds a predetermined thickness; and
varying said degree of focus of said high energy beam only if said determined already fused thickness of said three-dimensional article below said powder which is to be fused is less than the predetermined thickness,
wherein:
a mean spot size of the protracted beam spot on said workpiece in a direction perpendicular to the scanning direction is smaller than a mean spot size of the protracted beam spot on said workpiece in a direction parallel to the scanning direction for a full scan length, a full cross section and/or for a full 3-dimensional article.

12. The method according to claim 11, wherein said means for altering said focus of said high energy beam is selected from at least one of the group consisting of: a focus lens, an astigmatism lens, a vacuum level, a grid potential of an electron beam source, or an aperture size of a laser beam source.

13. The method according to claim 11, wherein said thickness of said three-dimensional article is the thickness directly below a spot of said high energy beam on said layer of powder.

14. The method according to claim 11, wherein said thickness is a total number of powder layers which have been fused.

15. The method according to claim 11, wherein said thickness is the uninterrupted total number of powder layers which have been homogenously fused together.

16. The method according to claim 11, further comprising the step of varying at least one of a deflection speed or the beam power of said energy beam based upon the determined already fused thickness of said three-dimensional article below said powder which is to be fused.

17. The method according to claim 11, wherein said high energy beam is at least one of an electron beam or a laser beam.

18. The method according to claim 11, wherein said deflection source is one of a tiltable mirror, a tiltable lens, or a deflection coil.

19. The method according to claim 11, wherein:
the method further comprises the step of receiving and storing, within one or more memory storage areas, a model of said at least one three-dimensional article; and
at least the step of varying the degree of focus of the high energy beam is performed via execution of one or more computer processors.

* * * * *